Dec. 22, 1942. H. D. SORENSON 2,305,642
BAND SLITTER
Filed Jan. 10, 1941
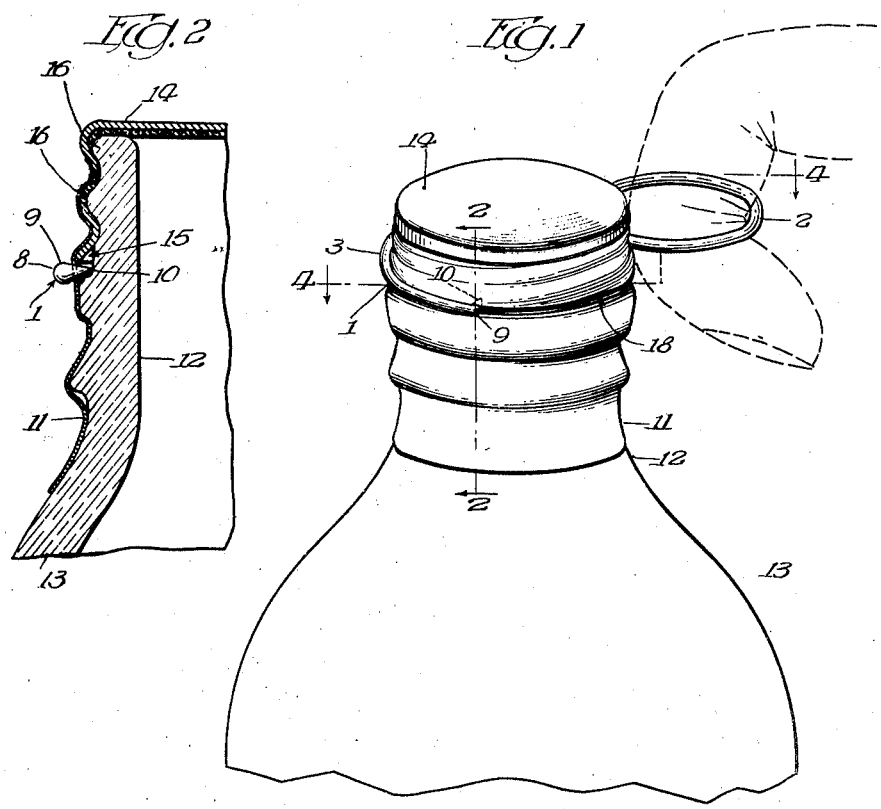
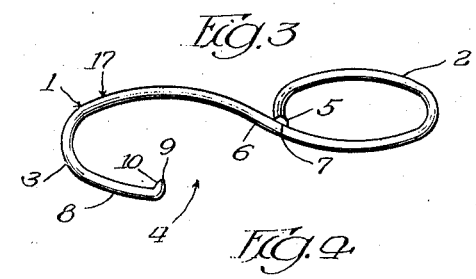
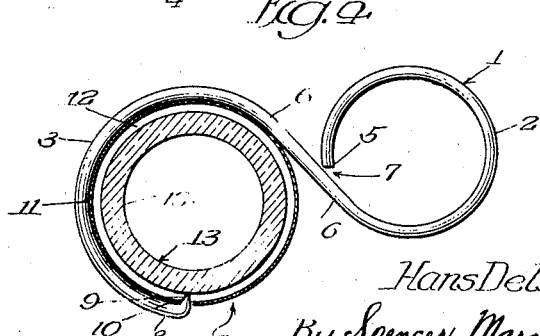
Inventor
Hans Delsgard Sorenson
By Spencer, Marzall, Johnston & Cook
Attys Patented Dec. 22, 1942

2,305,642

UNITED STATES PATENT OFFICE 2,305,642

BAND SLITTER

Hans Delsgard Sorenson, Madison, Wis., assignor to The Celon Company, Madison, Wis., a corporation of Wisconsin Application January 10, 1941, Serial No. 373,915

4 Claims. (Cl. 30—2)

This invention relates to a device for permitting quick and easy removal of a closure or stopper for bottles.

It has been customary to apply seals about the necks of bottles to seal the bottle closure or stopper in position, as well as to ornament the bottle necks. Moreover, seals made of regenerated cellulose have been very popular in the past for sealing the closure to the bottle. Sometimes these bands are made of translucent or transparent material, and in other cases they are made from regenerated cellulose having certain opacity with a clear band so as to permit full view of the Government stamp about liquor bottles. Seals and bands of this type are relatively hard to remove because after dehydration they become very tough. Numerous means have heretofore been provided to remove these bands, but because of the shrinkage certain slots or finger tabs provided in the material to assist in removing the bands detract from the ornamental appearance of the bands. It is therefore an important object of the present invention to provide a new and novel tool which can be readily and economically manufactured for the purpose of quickly and easily severing the tough protecting seal.

Another important object of the present invention is the provision of a new and improved device for slitting a protective covering, such as a band or cap, which is placed about the neck of a bottle to secure the bottle closure or stopper in position, the device comprising a band slitter made of relatively flexible material capable of being easily spread apart to conform with the neck of a bottle and having a knife or cutting edge at one end thereof which is adapted to be positioned beneath the bottle closure, whereby the band is slit circumferentially during rotative movement of the bottle or by rotating the slitter.

Another important object of the invention is the provision of a band slitter having a flexible operating end made of resilient wire material so that the operating end may be easily applied about the bottle neck because of the resiliency of the material, the slitter being provided with an in-turned cutting edge adapted to pierce the material beneath a bottle closure to cut the protective band or seal beneath the closure during rotative movement of the slitter or the bottle.

A still further object of the invention is the provision of a band slitter made of one piece of resilient wire material having an engaging jaw which is adapted to be sprung a predetermined distance so as to engage the neck of a bottle so as to cut the bottle seal of tough material such as regenerated cellulose, the band slitter having a pointed cutting edge adapted to pierce the seal beneath the bottle cap, whereby rotative movement of the bottle or the slitter will cause the protective seal to be cut circumferentially beneath the closure, the slitter being also provided with an operating end through which a finger may be inserted for proper manipulation.

A still further object of the invention is the provision of a tool particularly adapted for cutting regenerated cellulose bands or caps which are applied about the necks of bottles, the tool being made of a single piece of flexible resilient wire material having an open cutting or operating end adapted to be sprung apart to receive the bottle and then returned, because of its resiliency, to relative normal position so as to create a tension about the neck of the bottle, there being a pointed cutting or slitting end at the operating end of the device to pierce and cut the seal upon rotation of either the bottle or the device, a handle end in the form of a ring being integrally secured to the member to permit manipulation thereof.

Numerous other objects and advantages will be apparent throughout the progress of the following specification.

The accompanying drawing illustrates a selected embodiment of the invention and the views therein are as follows:

Fig. 1 is a detail elevational view of a bottle having a closure thereon and a protective band or seal thereabout, and showing the device in operative cutting position;

Fig. 2 is a detail vertical sectional view on the line 2—2 of Fig. 1;

Fig. 3 is a perspective view of the improved band slitter; and

Fig. 4 is a detail transverse sectional view on the line 4—4 of Fig. 1.

The device or band slitter herein shown for the purpose of illustrating the invention comprises a body element 1 made of a single piece of relatively stiff but relatively resilient material, such as properly tempered wire. The body 1 may be in the form of the letter S having one of its loops closed, or in the form of the numeral 8 having one side open, as shown in Fig. 3. The body 1 has a handle portion 2 and an engaging or operating end 3 with an open side to provide a receiving jaw 4. The end of handle portion 2 is in the form of a loop, being relatively circular, and has its free end 5 touching or almost touching the reversely curved part 6, as indicated at 7, Figs. 3 and 4.

The operating end 3 of the band slitter is in the form of a loop, being relatively circular, but has its free end 8 spaced a predetermined distance from the reversely curved part 6 to provide the said receiving opening or jaw 4. The free end 8 is provided with an integral in-turned point 9 having a cutting edge 10, the point being adapted to pierce a protective seal or band 11 placed about the neck 12 of a bottle 13 to secure the bottle closure 14 in tamper-proof position. The piercing point 9 is adapted to be received in the annular groove 15, Fig. 2, formed in the bottle neck 12 immediately below the threaded ribs 16 on the bottle neck.

The device is applied by forcing the jaw 4 about the neck of a bottle at the annular recess 15, and inasmuch as the slitter 1 is made of relatively resilient material, the free end 8 will give or expand sufficiently to permit the slitter to be easily spread apart into engaging position, permitting the slitter to accommodate bottles having necks of various diameters. After the device has been spread apart the bottle neck will fit in the circular receiving part 17 of the operating end 3 and then, because of the natural resiliency of the material from which the band slitter is made, will spring back into engaging position with the bottle neck. In applying the device the point 9 will pierce the seal 11 whereby movement of the band slitter in a clockwise direction, Fig. 4, or counter-clockwise movement of the bottle, will cause the band 11 to be slit or cut circumferentially at the point indicated at 18, Fig. 1, thereby severing the seal 11 in two parts and permitting the closure to be removed without hindrance because of the band 11.

The device is adapted to be made of wire properly tempered so that the end 3 is relatively springy so that it may easily accommodate itself to the neck of a bottle. The extreme end 8 is turned in to provide a piercing point 9 having a cutting edge 10, whereby the tough band may be readily and easily severed.

The invention provides a small, handy, inexpensive tool for removing by cutting or slitting the band directly beneath the closure, whereby the closure may be instantly removed.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A band slitter for cutting a protective seal placed about the neck of a bottle to secure the bottle closure in place and comprising a body made of a single piece of material having a curved end adapted to receive the neck of a bottle, said curved end being relatively resilient so as to permit the device to be easily applied about the neck of the bottle, and a cutter on the end of the body adapted to pierce the seal beneath the closure and slit the seal upon rotation of the slitter in one direction or upon rotation of the bottle in an opposite direction.

2. A band slitter for cutting a protective seal placed about the neck of a bottle to secure the bottle closure in place and comprising a body made of a single piece of material having a curved end adapted to receive the neck of a bottle, said curved end being relatively resilient so as to permit the device to be easily applied about the neck of the bottle, and a turned-in projection arranged at the extreme end of said curved end and providing a cutter adapted to pierce the seal when the resilient curved end is applied over the seal at the bottle neck, said cutter slitting the band about its circumference upon rotation of either the bottle or slitter after the cutter has pierced the band.

3. A band slitter to slit a seal about the neck of a bottle having a closure to permit removal of the closure comprising a body made of a single pieces of relatively resilient material and configured generally in the form of the letter S whereby one end of the body acts as a handle and the other end acts as an operating or cutting end, the cutting end being spaced a predetermined distance from the main body part to provide a receiving jaw adapted to receive and encircle the neck of a bottle, the extremity of said cutting end being inturned and pointed so as to pierce the seal upon being applied thereto and to sever the seal upon rotative movement of the body or the bottle in a predetermined direction when so applied.

4. A band slitting device for cutting a protective seal placed about the neck of a bottle to secure a bottle closure in place and comprising a body having a curved end adapted to receive the neck of a bottle, said curved end being relatively resilient so as to permit the device to be applied easily about the neck of the bottle in position to perform a slitting operation, and a cutter element on a portion of said curved end adapted to pierce the seal beneath the closure and slit the seal upon rotation of either the slitter or the bottle.

HANS DELSGARD SORENSON.